Sept. 8, 1970  D. H. OWEN, SR  3,526,934
INTERLOCKING SPACERS
Filed Aug. 20, 1968  4 Sheets-Sheet 1
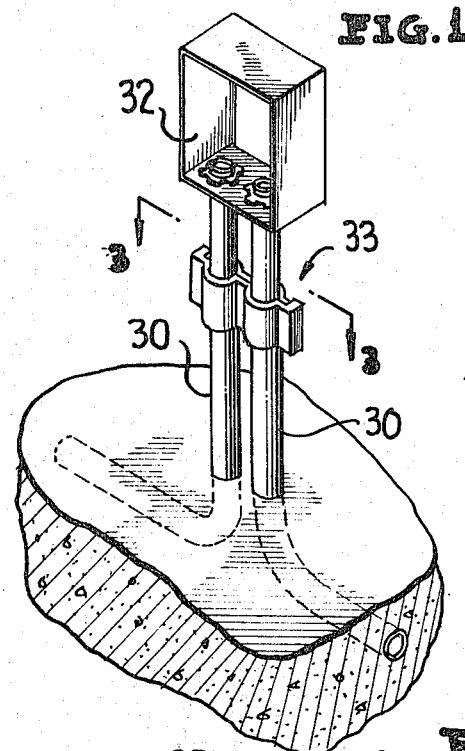
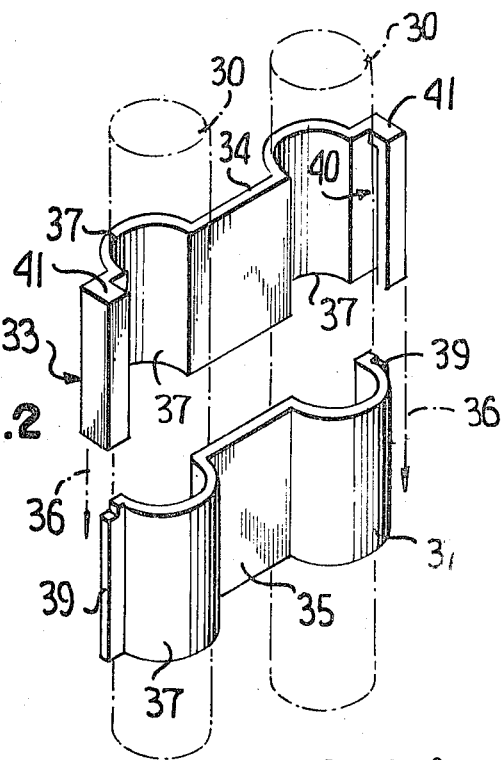
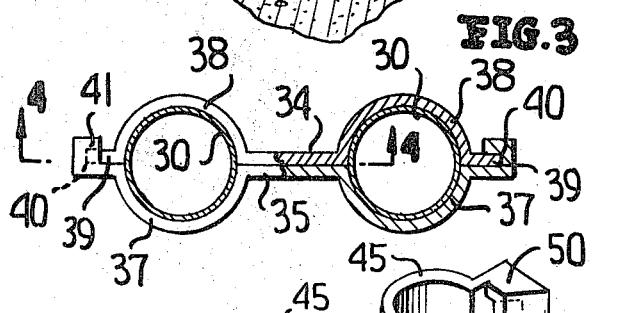
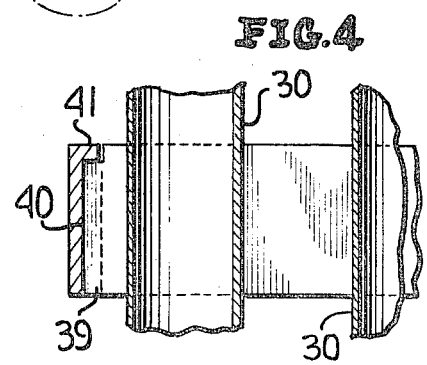
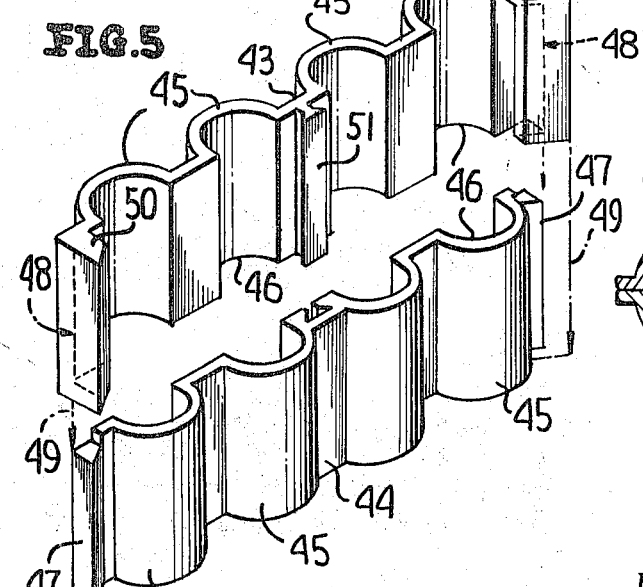
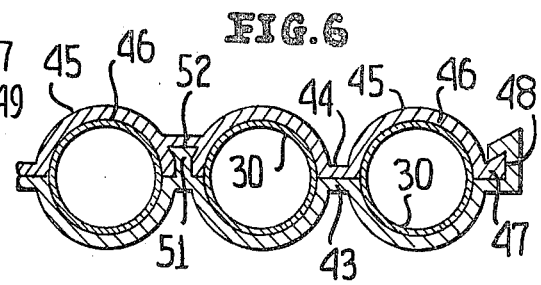
INVENTOR
DAVID H. OWEN, Sr.
BY *Mason, Porter, Diller & Brown*
ATTORNEYS

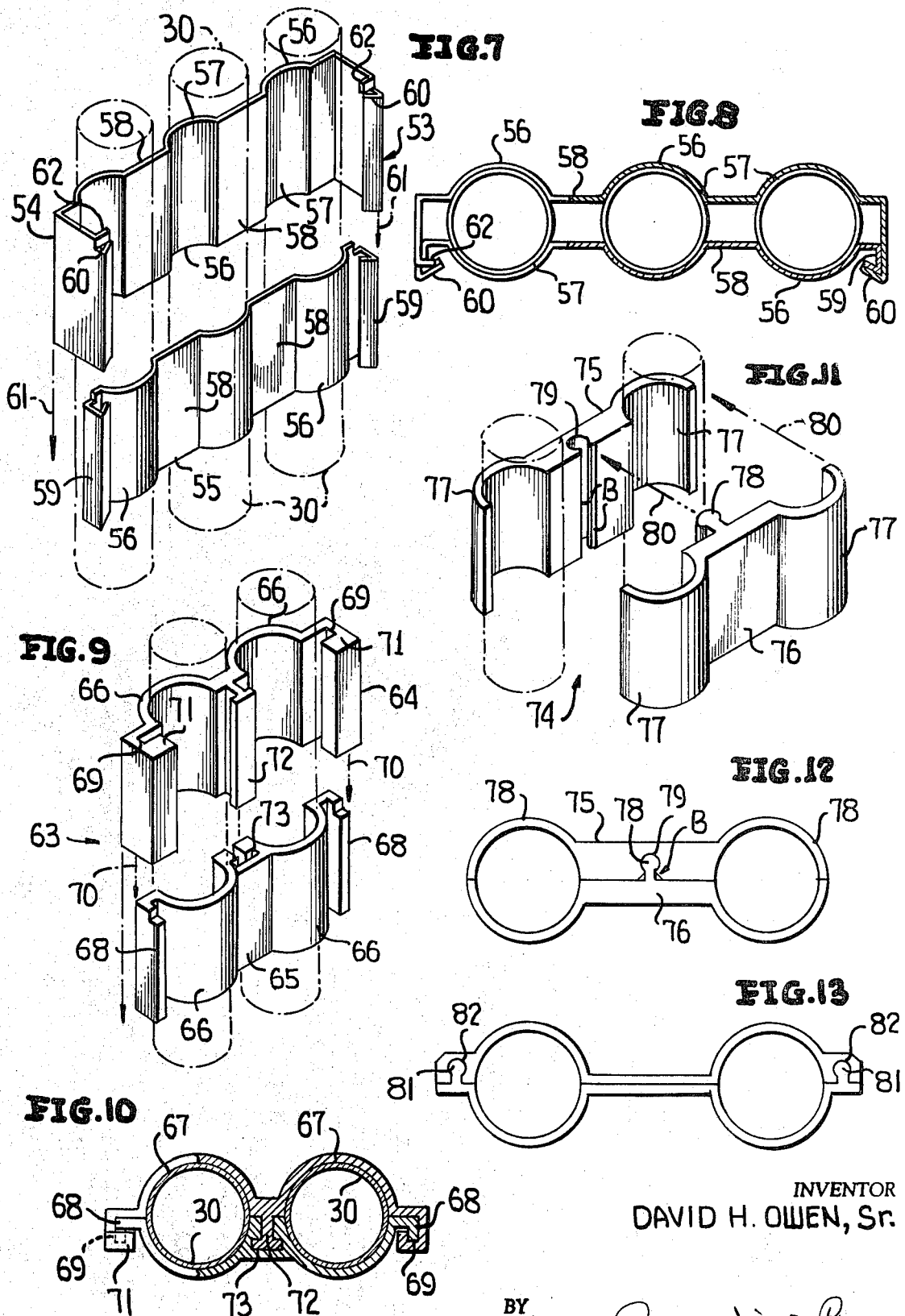

Sept. 8, 1970  D. H. OWEN, SR  3,526,934
INTERLOCKING SPACERS
Filed Aug. 20, 1968  4 Sheets-Sheet 3
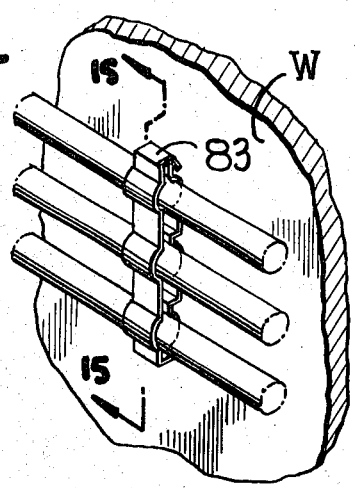
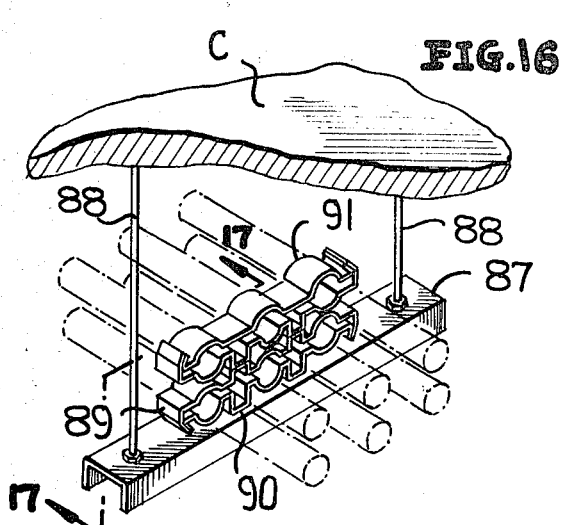
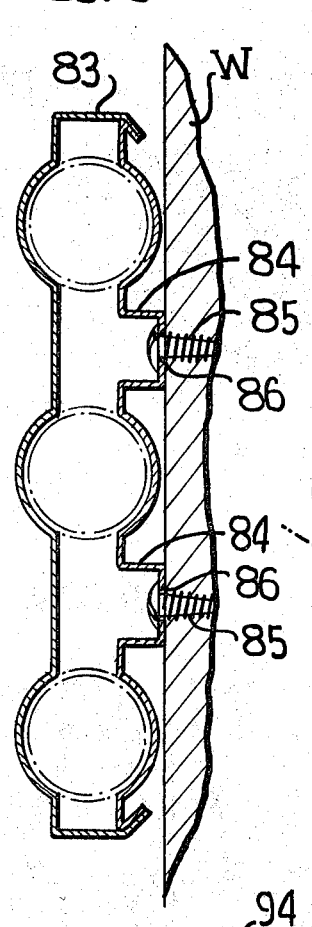
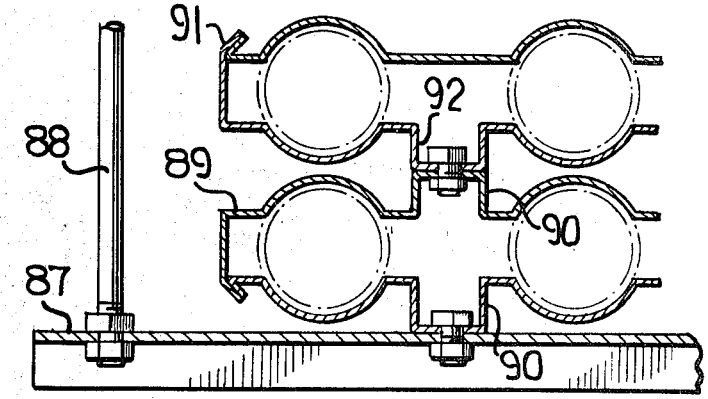
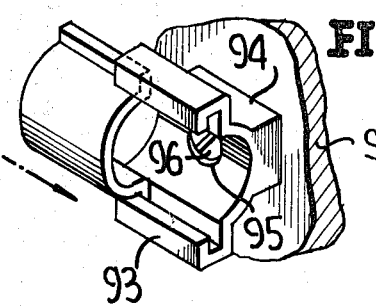
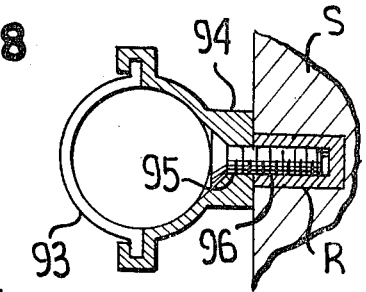
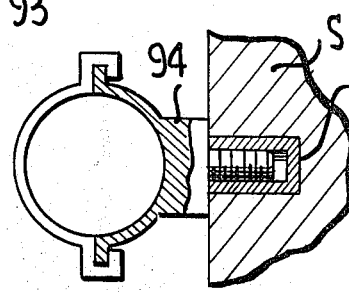
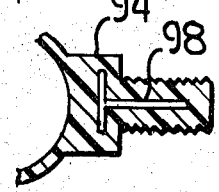
INVENTOR
DAVID H. OWEN, Sr.
BY
Mason, Porter, Diller & Brown
ATTORNEYS Sept. 8, 1970  D. H. OWEN, SR  3,526,934
INTERLOCKING SPACERS
Filed Aug. 20, 1968  4 Sheets-Sheet 4
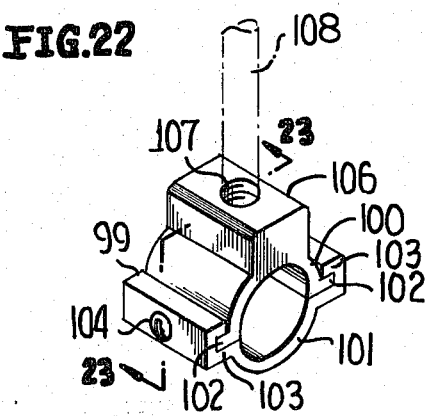
FIG.22
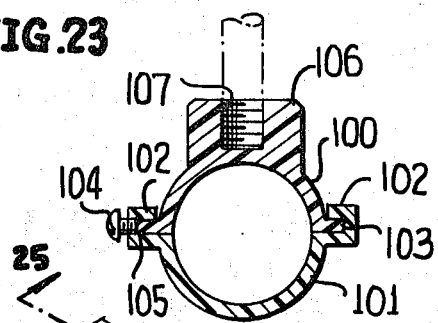
FIG.23
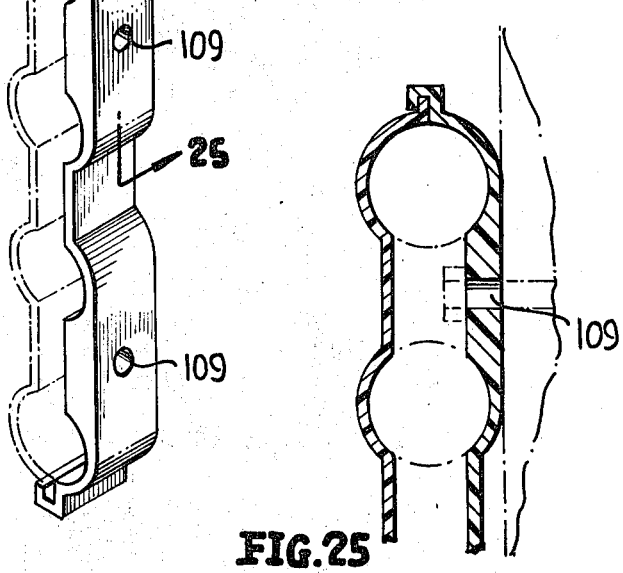
FIG.24
FIG.25
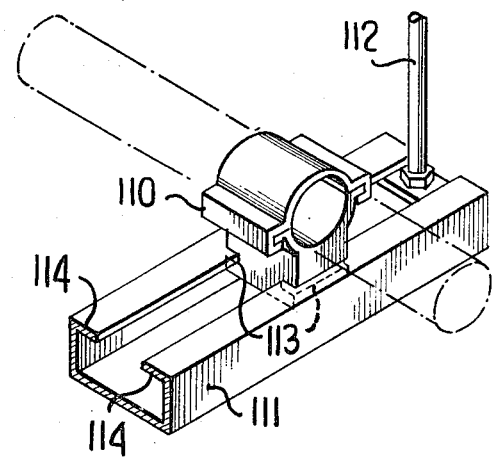
FIG.26
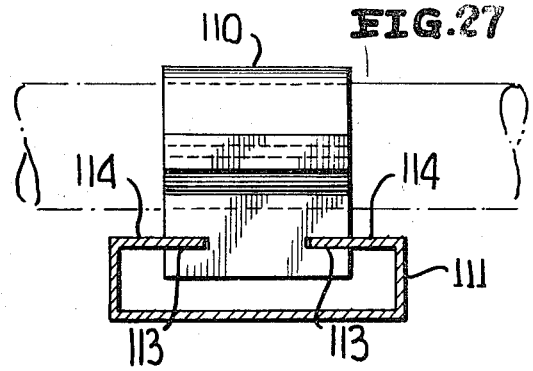
FIG.27
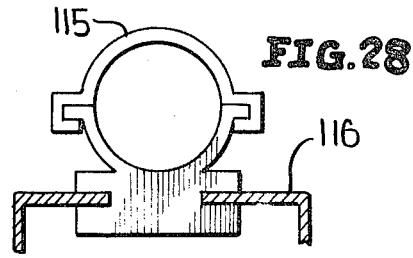
FIG.28
INVENTOR
DAVID H. OWEN, Sr.
BY Mason, Porter, Diller & Brown
ATTORNEYS

United States Patent Office 3,526,934
Patented Sept. 8, 1970

3,526,934
INTERLOCKING SPACERS
David H. Owen, Sr., 4019 Michael Blvd.,
Mobile, Ala. 36609
Filed Aug. 20, 1968, Ser. No. 754,001
Int. Cl. A44b *21/00;* F16l *3/22*
U.S. Cl. 24—81                                                18 Claims

ABSTRACT OF THE DISCLOSURE

This disclosure relates to a device for maintaining a plurality of tubular members in spaced parallel relation. The device comprises complementary halves defining at least two spacer pockets therebetween for fixing tubular members in a predetermined spaced relation. The complementary halves have coacting interfitting tongue and groove portions for interlocking the device about the tubular members, preferably by longitudinally sliding one of the halves relative to the other, but in other instances by interconnecting snap action.

This invention relates to a device for maintaining a plurality of tubular members in spaced parallel relation, and more particularly, for obtaining the proper spacing of conduits and tubing for entrances to outlet boxes and panelboard cabinets.

The construction of modern structures involves problems relating to the installation of electrical conduits for transmission of current into outlet boxes and panelboards. Ordinarily, the conduits are run through the structure, imbedded in floors and walls, and emerge just beneath or adjacent to the outlet box or panelboard to which they are to be connected. In common practice, the conduits are stubbed through concrete slabs, floors and walls before the concrete is put in place. When the concrete has been set up, extensions are made from the ends of the conduits to the final terminals of the outlet box or panelboard.

Problems arise, however, when the spacing between the conduits extending up from the floor or out from the wall does not conform to the spacing between the entrance openings of the outlet box or panelboard cabinet. When this occurs, it becomes necessary to bend or off-set the conduits in order to align them with the entrance openings. This adjustment involves considerable time and expense and it necessarily detracts from the appearance of the installation. Moreover, extensive off-setting or bending of the conduits often causes internal damage to the supporting structure. Chipping away of the concrete at the surface of the floor or wall where the conduits emerge is often necessary in order to effect the proper alignment.

It is, therefore, the primary object of this invention to provide a device for maintaining a plurality of electrical conduits, passing through concrete slabs, floors and partitions, in predetermined spaced parallel relation.

Another object of this invention is to provide a device for maintaining a plurality of tubular members in spaced parallel relation and having novel means for interlocking the device about the tubular members.

More particularly, it is an object of this invention to provide a device having complementary halves defining a plurality of spacer pockets therebetween, and coacting tongue and groove portions formed in opposed surfaces of the complementary halves for interlocking the device about a plurality of tubular members by longitudinally sliding one of the halves relative to the other.

Another use for an interlocking spacer formed in accordance with this invention is in preventing cables and conductors from coming too close together and creating induction problems. The spacers may be used on three phase circuits in raceways and cable troughs for grouping individual conductors of three phase circuits. The spacers may also be used for symmetrical forming in switchboards, on racks and various types of electrical cabinets, saving considerable installation time.

With the above and other objects in view that will hereinafter appear, the nature of the invention will be more clearly understood by reference to the following detailed description, the appended claimed subject matter and the several views illustrated in the accompanying drawings.

In the drawings:

FIG. 1 is a perspective view of two conduits extending from a concrete slab into an outlet box and being spaced by an interlocking spacer formed in accordance with this invention.

FIG. 2 is a perspective view of the two halves of the interlocking spacer shown in FIG. 1, the same being arranged relatively for being moved endwise into assembly relation about two tubular members.

FIG. 3 is a view, partly in section, taken along line 3—3 of FIG. 1.

FIG. 4 is a view taken along line 4—4 of FIG. 3.

FIG. 5 is a perspective view similar to FIG. 2 and illustrating modified form of interlocking spacer.

FIG. 6 is a partial horizontal sectional view of the device of FIG. 5 in assembled form.

FIG. 7 is a perspective view similar to FIG. 2 and illustrating another modified form of interlocking spacer.

FIG. 8 is a partial sectional view taken along a horizontal line through the device of FIG. 7 when assembled.

FIG. 9 is a perspective view similar to FIG. 2 of a still further modified form of interlocking spacer.

FIG. 10 is a view partly in section taken along a horizontal line through the device of FIG. 9 when assembled.

FIG. 11 is a perspective view similar to FIG. 2 of another modified form of interlocking spacer.

FIG. 12 is a plan view of the device of FIG. 11 when assembled.

FIG. 13 is a modified form of the device of FIG. 11.

FIG. 14 is a perspective view of an interlocking spacer formed in accordance with this invention and adapted to be mounted on a structural surface.

FIG. 15 is a view taken along line 15—15 of FIG. 14.

FIG. 16 is a perspective view of a plurality of interlocking spacers formed in accordance with this invention connected together and fastened to a support suspended from an overhead surface.

FIG. 17 is a sectional view taken along line 17—17 of FIG. 16.

FIG. 18 is a perspective view of a single pocket unit interlocking spacer and showing another means by which the spacer can be fastened to a support.

FIGS. 19 and 20 are end elevations, partly in section, of a single spacer pocket showing modified interlocks and other means by which the spacers can be fastened to support structures.

FIG. 21 is a framentary sectional view of the stud portion of a device similar to that shown in FIG. 20 and having a T-shaped reinforcement in a plastic mounting base.

FIG. 22 is a perspective view of a single spacer element having means for mounting on a rod-like support.

FIG. 23 is a sectional view taken along line 23—23 of FIG. 22.

FIG. 24 is a perspective view of an interlocking spacer formed in accordance with this invention and having holes formed in one of its halves for fastening the spacer to a structural surface.

FIG. 25 is a sectional view taken along line 25—25 of FIG. 24.

FIG. 26 is a perspective view of a single spacer element formed in accordance with this invention and having guide means adapted for sliding engagement with a support channel.

FIG. 27 is an end elevation view of the channel mounted spacer arrangement illustrated in FIG. 26, the channel being shown in cross section.

FIG. 28 is a modified form of the channel mounted spacer arrangement illustrated in FIGS. 26 and 27.

Referring now to the drawings in detail, there is illustrated in FIG. 1 a pair of tubular conduits 30 extending upwardly from a slab of concrete 31 or other structural material into an outlet box 32. An interlocking spacer embodying the invention and generally designated 33 is positioned about the two conduits 30 and serves to maintain them in the desired spaced parallel relation.

FIG. 2 shows the spacer 33 prior to interlocking with its complementary halves 34 and 35 positioned about the tubular conduits 30 and adapted to be interlocked by sliding the half 34 downwardly in the direction of arrows 36 relative to the half 35. Each of the two complementary halves 34 and 35 is formed with at least two semi-cylindrical portions 37 which are adapted to cooperate with opposing semi-cylindrical portions to define spacer pockets 38, as shown in FIG. 3, for positioning the tubular conduits 30 therein.

The half 35 further includes two tongue portions 39 having generally rectangular cross-sections which are adapted to coact with groove portions 40 formed in opposing portions of the half 34 for interlocking the complemetnary halves 34 and 35 of the spacer 33 together. As seen most clearly in FIG. 4, one end of each of the groove portions 40 is formed with an overhanging lip or stop abutment 41 for limiting the extent of sliding movement of the tongue portions 39 therein.

Referring now to the modified form of interlocking spacer illustrated in FIG. 5, a spacer referred to generally by the numeral 42 is shown having complementary halves 43 and 44. Each of the complementary halves 43 and 44 is formed with four semi-cylindrical portions 45 which cooperate with opposing semi-cylindrical portions to define spacer pockets 46. In FIG. 6 the tubular conduits 30 are shown spaced apart in the spacer pockets 46. The half 44 includes two outer tongue portions 47 having trapezoidal cross-sections which are adapted to coact with trapezoidal groove portions 48 formed in opposing portions of the half 43 to interlock the spacer 42 about a plurality of tubular conduits when the half 43 is slid longitudinally relative to the half 44 in the direction of the arrows 49. See FIG. 6. The groove portions 48 are formed at one end with overhanging lips or stop abutments 50 which serve to limit the extent of sliding movement of the tongue portions 47 therein in effecting final assembly of the spacer halves. The half 43 is further formed with an intermediate Y-shaped tongue portion 51 which is adapted to slidingly engage and interlock with an opposing Y-shaped groove portion 52 formed in the half 44.

A still further modified form of interlocking spacer is illustrated in FIG. 7, preferably formed of sheet metal, and generally designated 53. The spacer 53 includes complementary halves 54 and 55. The halves 54 and 55 are each formed with three bight or groove portions 56 which are adapted to cooperate with opposing groove portions to form spacer pockets 57 for maintaining three tubular conduits 30 in the desired spaced parallel relation. The complementary halves 54 and 55 include flat wall portions 58 extending between adjacent groove portions 56.

The half 55 is further formed with two outer tongue portions 59 which are adapted to coact with groove portions 60 formed in opposing portions of the half 54 upon longitudinally sliding the half 54 relative to the half 55 in the direction of the arrows 61. Each of the grooves 60 is further formed at one end thereof with an overhanging lip or stop abutment 62 for limiting the extent of sliding movement of the tongue portions 59 therein in effecting ultimate assembly of the spacer halves.

As seen most clearly in FIG. 8, the bight or groove portions 56 and wall sections 58 of each of the complementary halves 54 and 55 remain fixed in spaced relation to opposing bight or groove portions 56 and wall sections 58 upon interlocking of the spacer 53. This is in contrast to the spacers illustrated in FIGS. 2 and 5, as well as the spacers illustrated in FIGS. 9 and 11, where opposing surfaces of the complementary halves fit flush against one another upon interlocking of the respective spacers.

A yet further modified form of interlocking spacer is illustrated in FIG. 9 and is generally designated 63. The spacer 63 includes complementary halves 64 and 65. Each of the halves 64 and 65 is formed with two semi-cylindrical portions 66 adapted to cooperate with opposing semicylindrical portions to define two spacer pockets 67 for maintaining two tubular conduits 30 in spaced parallel relation. The half 65 is further formed with two outer tongue portions 68 which are adapted to coact with two groove portions 69 formed in opposing portions of the half 64 upon interlocking of the spacer 63 by longitudinally sliding the half 64 relative to the half 65 in the direction of arrows 70. The groove 69 include overhanging lip portions or stop abutments 71 for limiting the extent of sliding movement of the tongue portions 68 therein. The half 64 is further formed with an intermediate T-shaped tongue portion 72 which is adapted to slidably engage and interlock with a T-shaped groove 73 formed in the opposing face of the half 65.

Another modified form of interlocking spacer is illustrated in FIG. 11 and is generally designated 74. The spacer 74 includes complementary halves 75 and 76. Each of the complementary halves 75 and 76 is formed with two semi-cyclindrical portions 77 which are adapted to cooperate with opposing semi-cylindrical portions to define two spacer pockets, as clearly illustrated in FIG. 12. The half 76 is further formed with a tongue portion 78 having an in-part circular cross-section and which is adapted to coact with a groove portion 79 which is formed in an opposing portion of the half 75 for interlocking the complementary halves 75 and 76 of the spacer 74 together.

The spacer 74 may be interlocked about a plurality of tubular conduits by longitudinally sliding one of the complementary halves 75 and 76 relative to the other as was the case in the previously described embodiments of the invention. However, the spacer 74 is intended to be formed of a resilient material such as plastic so that the halves 75 and 76 may be brought together in opposing face relation in the direction of arrows 80 and thereafter snapped together to form the interlock. In order to facilitate the action, bevelled lead-in entrance portions B may be provided at the sides of the groove defining the entrance thereinto.

A modified form of the spacer 74 is illustrated in FIG. 13. This spacer includes two outer tongue portions 81 coacting with two outer groove portions 82 instead of a single intermediate tongue and groove arrangement as illustrated in FIGS. 11 and 12.

It is readily apparent that the spacers of FIGS. 11 to 13 offer a flexibility in use that is not provided in the other modified forms of the invention. A workman installing the spacers may effect the interlock by sliding the complementary halves together or he may snap them together, whichever method is most convenient and efficacious at the moment.

FIGS. 14 and 15 illustrate one method by which an interlocking spacer formed in accordance with this invention may be adapted to be fastened to a vertical support such as a wall. An interlocking spacer generally designated 83 is shown constructed along the lines of the spacer 53 illustrated in FIG. 7 but includes channels 84 formed in one of the halves thereof. The spacer 83, or rather the wall engaging half thereof, may be fastened to a wall W by means of screws 85 inserted through holes 86 in the channels 84.

Another method for supporting a plurality of conduits in one or more spacers is illustrated in FIGS. 16 and 17. A horizontal support 87 is shown suspended by means of rods 88 from a ceiling C. A spacer 89 having channels 90 formed in each of its halves is shown bolted to the support 87. Another spacer 91 similar to the spacer 83 illustrated in FIG. 14 and having channels 92 formed in one of its halves is, in turn, bolted to the channels 90 formed in one of the halves of the spacer 89 to thereby form a tandem or superposed arrangement of spacer units for spacing and supporting a plurality of overlying tubular conduits.

FIG. 18 shows a single spacing element or pocket 93 having a base portion 94 with a hole 95 formed therein. The element 93 may be fastened to a wall or other support S by means of a screw 96 inserted through the hole 95 in the base 94, directly into the wall or into a sleeve or cup-like retainer R mounted therein.

FIG. 20 illustrates a modified form of the spacing element 83. Here the base 94, preferably molded of plastic, is formed with an externally threaded stud portion 97 for engagement with the support S. FIG. 21 shows the base 94 having a T-shaped metal reinforcement 98 embedded therein.

FIG. 22 illustrates another spacing element 99 having complementary halves 100 and 101. The half 100 is formed with tongue portions 102 which are adapted to coact with groove portions 103 formed in the half 101. A setscrew 104 is inserted through a hole 105 in the half 101 and engaging one of the tongue portions 102 to fix the position of the complementary halves 100 and 101 relative to each other, as shown in FIG. 23. The spacing element 99 includes a base portion 106 having a threaded tap 107 drilled therein for mounting on a threaded end of a rod 108.

FIG. 24 illustrates another interlocking spacer generally comparable to FIG. 15 but preferably formed of plastic instead of metal and having holes 109 formed in one of its halves so as to be adapted to receive fastening means, as shown in FIG. 25.

FIGS. 26 and 27 illustrate a spacing element adapted for sliding engagement with a channel 111. The channel 111 may be suspended from an overhead surface by means of rods 112. The spacing element 110 includes a depending base which is grooved at 113 for receiving the flanges 114 on the channel 111.

A spacing element 115 similar to the element 110 illustrated in FIG. 26 is shown in FIG. 28 mounted on a support channel 116. In this modification it will be observed that the element is disposed to support a conduit or tubular member which extends at least in part along, rather than across the channel 116.

From the foregoing, it should be readily apparent that applicant has provided an interlocking spacer which is both economical and useful in a myriad of applications. Considerable time and cost may be saved by using applivant's invention for spacing conduits passing through concrete slabs, floors and partitions, as well as for other uses where a predetermined spacing between tubular members is desired. Applicant's spacers may be quickly and easily installed without the need for tools or other equipment.

Although only preferred embodiments of the invention have been specifically illustrated and described herein, it is to be understood that minor variations may be made in the interlocking spacers without departing from the spirit of the invention.

I claim:

1. A device for maintaining a plurality of elongated members in spaced parallel relationship comprising a pair of separate complementary halves each of which includes at least two spaced semi-cylindrical portions, each semi-cylindrical portion of one half being adapted for alignment with a semi-cylindrical portion of the remaining half to define a plurality of spaced spacer pockets each of which is adapted to receive one of said elongated members therein, said halves having aligned contacting transverse edges whereby the elongated members are entirely and completely wrapped by said halves when in interlocked assembled relationship, and means formed at said transverse edges for interlocking the halves together by relative sliding movement generally parallel to the spacer pocket axes, said interlocking means being in the form of coacting tongue and groove portions at said transverse edge portions, and said interlocking means forming the sole means for maintaining said halves in interlocked assembled relationship.

2. The device of claim 1 wherein said tongue and groove portions are substantially rectangular in cross-section.

3. The device of claim 1 wherein each of said complementary halves includes both tongue and groove portions.

4. The device of claim 1 wherein said tongue and groove portions are trapezoidal in cross-section.

5. The device of claim 1, at least two bight portions being formed in each of said complementary halves, wall sections extending between said bight portions, and said bight portions and said wall sections of each of said complementary halves being fixed in spaced relation to opposing ones of said bight portions and said wall sections upon interlocking of said device.

6. The device of claim 5 wherein at least one said wall portion between two bight portions of at least one of said halves has a channel projection apertured to receive a fastener for securing said one half to a similar half or to some other support medium.

7. The device of claim 1 wherein one of said halves includes two outer groove portions and an intermediate tongue portion, and the outer of said halves includes two outer tongue portions adapted to coact with said outer groove portions and an intermediate groove portion adapted to coact with said intermediate tongue portion.

8. The device of claim 7 wherein said intermediate tongue and groove portions are Y-shaped in cross-section.

9. The device of claim 7 wherein said intermediate tongue and groove portions are T-shaped in cross-section.

10. The device of claim 1 wherein said means are formed of resilient material for interlocking said device by snapping said halves together.

11. The device of claim 1 wherein said tongue and groove portions are in-part circular in cross-section.

12. The device of claim 1 wherein said groove portions are formed with stop abutment means at one end thereof for limiting the extent of movement of said tongue portions therein.

13. The device of claim 1 including means for fastening said device to a structural support.

14. The device of claim 13 wherein said means for fastening includes holes formed in one of said halves adapted to receive fasteners.

15. The device of claim 13 wherein said means for fastening includes at least one externally threaded stud formed integrally with and extending from one of said halves.

16. The device of claim 15 wherein the half carrying the stud is formed of plastic and includes a base portion from which the stud projects, said stud including T-sectioned metal reinforcement therein and in said base.

17. The device of claim 13 wherein said means for fastening includes a support channel having inturned flanges defined a slideway, a base on one of said halves, and grooves in the base slidably receiving the channel flanges therein.

18. The device of claim 1 wherein said halves are each constructed from metallic material.

(References on following page)

References Cited

UNITED STATES PATENTS

| | | | |
|---|---|---|---|
| 466,578 | 1/1892 | Silberstein | 248—71 |
| 1,608,184 | 11/1926 | Rumble | 248—74 XR |
| 2,375,513 | 5/1945 | Bach | 248—68 XR |
| 2,388,201 | 10/1945 | Wohlhieter. | |
| 2,613,413 | 10/1952 | Budny | 24—10 |
| 2,621,384 | 12/1952 | Slaughter. | |
| 2,791,461 | 5/1957 | Goldenberg. | |
| 2,877,990 | 3/1959 | Goemann. | |
| 3,023,989 | 3/1962 | White. | |
| 3,160,175 | 12/1964 | Laemmle. | |
| 3,421,187 | 1/1969 | Ryder | 24—81.3 |

FOREIGN PATENTS

| | | |
|---|---|---|
| 693,497 | 8/1930 | France. |
| 1,439,861 | 4/1966 | France. |
| 18,212 | 1911 | Great Britain. |
| 158,629 | 2/1921 | Great Britain. |
| 272,144 | 6/1927 | Great Britain. |

DONALD A. GRIFFIN, Primary Examiner

U.S. Cl. X.R.

138—111; 248—68, 71